US012083928B2

United States Patent
Oguma et al.

(10) Patent No.: US 12,083,928 B2
(45) Date of Patent: Sep. 10, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hirokazu Oguma, Wako (JP); Yoshihiro Kanamaru, Wako (JP); Yasuo Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 17/667,591

(22) Filed: Feb. 9, 2022

(65) Prior Publication Data
US 2022/0297573 A1  Sep. 22, 2022

(30) Foreign Application Priority Data

Mar. 16, 2021  (JP) ................................. 2021-042624

(51) Int. Cl.
| B60L 58/20 | (2019.01) |
| B60K 6/28 | (2007.10) |
| H02J 7/00 | (2006.01) |

(52) U.S. Cl.
CPC ............ *B60L 58/20* (2019.02); *H02J 7/0013* (2013.01); *H02J 7/0048* (2020.01);
(Continued)

(58) Field of Classification Search
CPC ... B60K 6/28; B60L 2260/20; B60L 2260/26; B60L 50/62; B60L 50/66; B60L 58/18;
(Continued)

(56) References Cited

U.S. PATENT DOCUMENTS

| 11,130,422 B1 * | 9/2021 | Goldfarb .................. F03D 9/32 |
| 2011/0101915 A1 * | 5/2011 | Mitsutani ............. B60L 53/305 |
| | | 320/109 |

(Continued)

FOREIGN PATENT DOCUMENTS

| EP | 3098108 | 11/2016 |
| JP | 2009-243594 | 10/2009 |

OTHER PUBLICATIONS

European search report for European application No. 22156036.0 dated Aug. 2, 2022.

*Primary Examiner* — Babar Sarwar
(74) *Attorney, Agent, or Firm* — Amin, Turocy & Watson, LLP

(57) ABSTRACT

A vehicle control device includes a processor configured to execute computer-readable instructions to perform. The processor is configured to acquiring a state of a first battery and a state of a second battery having lower capacity and higher power than the first battery, calculating a first upper power limit value based on the state of the first battery, calculating a second upper power limit value based on the state of the second battery, and calculating a power output ratio between amounts of electric power to be supplied from the first battery and the second battery to a motor that outputs motive power for traveling based on the first upper power limit value and the second upper power limit value, and controlling electric power to be output to the motor based on a traveling mode of a vehicle, a maximum driving force in the motor, and the power output ratio. The controlling of the electric power includes changes the maximum amount of electric power based on whether or not the traveling mode is a first traveling mode in which traveling performance has higher priority than that in another traveling mode.

8 Claims, 5 Drawing Sheets

(52) U.S. Cl.
CPC ...... *H02J 7/0063* (2013.01); *H02J 7/007188* (2020.01); *B60K 6/28* (2013.01); *B60L 2260/20* (2013.01); *B60Y 2200/91* (2013.01); *B60Y 2200/92* (2013.01); *B60Y 2300/182* (2013.01)

(58) Field of Classification Search
CPC . B60L 58/20; B60Y 2200/91; B60Y 2200/92; B60Y 2300/182; H02J 7/0013; H02J 7/0048; H02J 7/0063; H02J 7/007188
See application file for complete search history.

(56) References Cited

U.S. PATENT DOCUMENTS

| | | | |
|---|---|---|---|
| 2016/0039307 A1* | 2/2016 | Okamura | H02J 7/00712 903/907 |
| 2019/0225092 A1* | 7/2019 | Li | B60L 58/18 |
| 2019/0299809 A1* | 10/2019 | Oyama | H02J 7/00302 |
| 2020/0001807 A1* | 1/2020 | Pighi | H02J 7/1423 |
| 2020/0223422 A1* | 7/2020 | Ye | B60K 6/485 |
| 2020/0231059 A1* | 7/2020 | Hishida | B60L 50/66 |
| 2021/0078427 A1* | 3/2021 | Li | H02M 7/043 |
| 2022/0185145 A1* | 6/2022 | Liu | H02J 7/342 |
| 2023/0072786 A1* | 3/2023 | Morita | H02J 7/342 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-042624, filed Mar. 16, 2021, the content of which is incorporated herein by reference.

BACKGROUND OF THE INVENTION

Field of the Invention

The present invention relates to a vehicle control device, a vehicle control method, and a storage medium.

Description of Related Art

In recent years, for example, development of electric vehicles such as hybrid electric vehicles (HEV) and plug-in hybrid electric vehicles (PHEV), each of which performs traveling using an electric motor driven with at least electric power supplied by a battery (a secondary battery), has progressed. In these electric vehicles, the driving of the electric motor is controlled on the basis of the amount of electric power stored in the battery. Further, in an electric vehicle system, a combination of two different types of batteries such as a low-power and high-capacity battery (hereinafter referred to as a "high-capacity type battery") and a low-capacity and high-power battery (hereinafter referred to as a "high-power type battery") has also been put into practical use.

Incidentally, in the related art, there is technology related to a vehicle in which a plurality of traveling modes in which the vehicle has traveling performance differences are provided (see, for example, Japanese Unexamined Patent Application, First Publication No. 2009-243594). When this conventional technology is taken into consideration, an electric vehicle having a traveling mode in which traveling performance is prioritized, for example, such as a sports mode, in addition to a normal traveling mode is conceivable. For example, automatically switching between these traveling modes in accordance with a traveling situation of the electric vehicle or intentionally switching between them in accordance with an intention of a user (a driver) of the electric vehicle is conceivable.

However, the traveling performance of an electric vehicle is determined according to the maximum driving force of an electric motor mounted therein. Thus, the maximum driving force in the electric vehicle is uniform in any of the traveling modes. For this reason, it may be difficult for the user (the driver) of the electric vehicle to experience a difference between the traveling modes as compared with a vehicle that travels using an internal combustion engine as a driving force.

SUMMARY OF THE INVENTION

The present invention has been made on the basis of the recognition of the above-described problems and an objective of the present invention is to provide a vehicle control device, a vehicle control method, and a storage medium capable of easily experiencing a difference between traveling modes in an electric vehicle.

A vehicle control device, a vehicle control method, and a storage medium according to the present invention adopt the following configurations.

(1): According to an aspect of the present invention, there is provided a vehicle control device including a processor configured to execute computer-readable instructions to perform: acquiring a state of a first battery and a state of a second battery having lower capacity and higher power than the first battery; calculating a first upper power limit value of the first battery based on the state of the first battery; calculating a second upper power limit value of the second battery based on the state of the second battery; and calculating a power output ratio that is the ratio between amounts of electric power to be supplied from the first battery and the second battery to a motor that outputs motive power for traveling based on the first upper power limit value and the second upper power limit value that have been calculated; and controlling electric power to be output to the motor based on traveling modes of a vehicle including a first traveling mode in which traveling performance has at least higher priority than that in another traveling mode and a second traveling mode different from the first traveling mode, the maximum driving force in the motor, and the power output ratio, wherein the controlling of the electric power includes changing the maximum amount of electric power based on whether or not the traveling mode is the first traveling mode.

(2): In the above-described aspect (1), the processor is configured to execute the computer-readable instructions to perform making the maximum amount of electric power to be output in the first traveling mode larger than the maximum amount of electric power to be output in the another traveling mode.

(3): In the above-described aspect (2), the processor is configured to execute the computer-readable instructions to perform: determining the maximum amount of electric power to be output in the first traveling mode based on at least the maximum driving force, and determining the maximum amount of electric power to be output in the another traveling mode based on at least the maximum driving force and the power output ratio.

(4): In any one of the above-described aspects (1) to (3), the processor is configured to execute the computer-readable instructions to perform: adjusting the time period until the electric power to be output in the traveling mode reaches the maximum amount.

(5): In the above-described aspect (4), the processor is configured to execute the computer-readable instructions to perform: performing adjustment to cause a first time period until the electric power to be output in the first traveling mode reaches the maximum amount to be shorter than a second time period until the electric power to be output in the another traveling mode reaches the maximum amount.

(6): In any one of the above-described aspects (2) to (5), the first traveling mode is the traveling mode in which the amount of electric power obtained by adding the amount of electric power from the second battery to the amount of electric power from the first battery is output to the motor, and the another traveling mode is the traveling mode in which at least the amount of electric power from the first battery is output to the motor.

(7): In the above-described aspect (6), the another traveling mode includes a second traveling mode in which the amount of electric power from the first battery is output to the motor and a third traveling mode in which the amount of electric power obtained by compensating the amount of electric power from the first battery with the amount of electric power from the second battery is output to the motor.

(8): According to an aspect of the present invention, there is provided a vehicle control method including: acquiring, by a computer, a state of a first battery and a state of a second battery having lower capacity and higher power than the first battery; calculating, by the computer, a first upper power limit value of the first battery based on the state of the first battery, calculating a second upper power limit value of the second battery based on the state of the second battery, and calculating a power output ratio that is a ratio between amounts of electric power to be supplied from the first battery and the second battery to a motor that outputs motive power for traveling based on the first upper power limit value and the second upper power limit value that have been calculated; determining, by the computer, the maximum amount of electric power to be output to the motor based on traveling modes of a vehicle including a first traveling mode in which traveling performance has at least higher priority than that in another traveling mode and a second traveling mode different from the first traveling mode, the maximum driving force in the motor, and the power output ratio; and changing, by the computer, the maximum amount of electric power based on whether or not the traveling mode is the first traveling mode.

(9): According to an aspect of the present invention, there is provided a non-transitory computer-readable storage medium storing a program for causing a computer to: acquire a state of a first battery and a state of a second battery having lower capacity and higher power than the first battery; calculate a first upper power limit value of the first battery based on the state of the first battery, calculate a second upper power limit value of the second battery based on the state of the second battery, and calculate a power output ratio that is the ratio between amounts of electric power to be supplied from the first battery and the second battery to a motor that outputs motive power for traveling based on the first upper power limit value and the second upper power limit value that have been calculated; determine the maximum amount of electric power to be output to the motor based on traveling modes of a vehicle including a first traveling mode in which traveling performance has at least higher priority than that in another traveling mode and a second traveling mode different from the first traveling mode, the maximum driving force in the motor, and the power output ratio; and change the maximum amount of electric power based on whether or not the traveling mode is the first traveling mode.

According to the above-described aspects (1) to (9), it is possible to easily experience a difference between traveling modes in an electric vehicle.

DETAILED DESCRIPTION OF THE INVENTION

Hereinafter, embodiments of a vehicle control device, a vehicle control method, and a storage medium of the present invention will be described with reference to the drawings.

As used throughout this disclosure, the singular forms "a," "an," and "the" include plural reference unless the context clearly dictates otherwise.

[Configuration of Vehicle]

Figure 1:
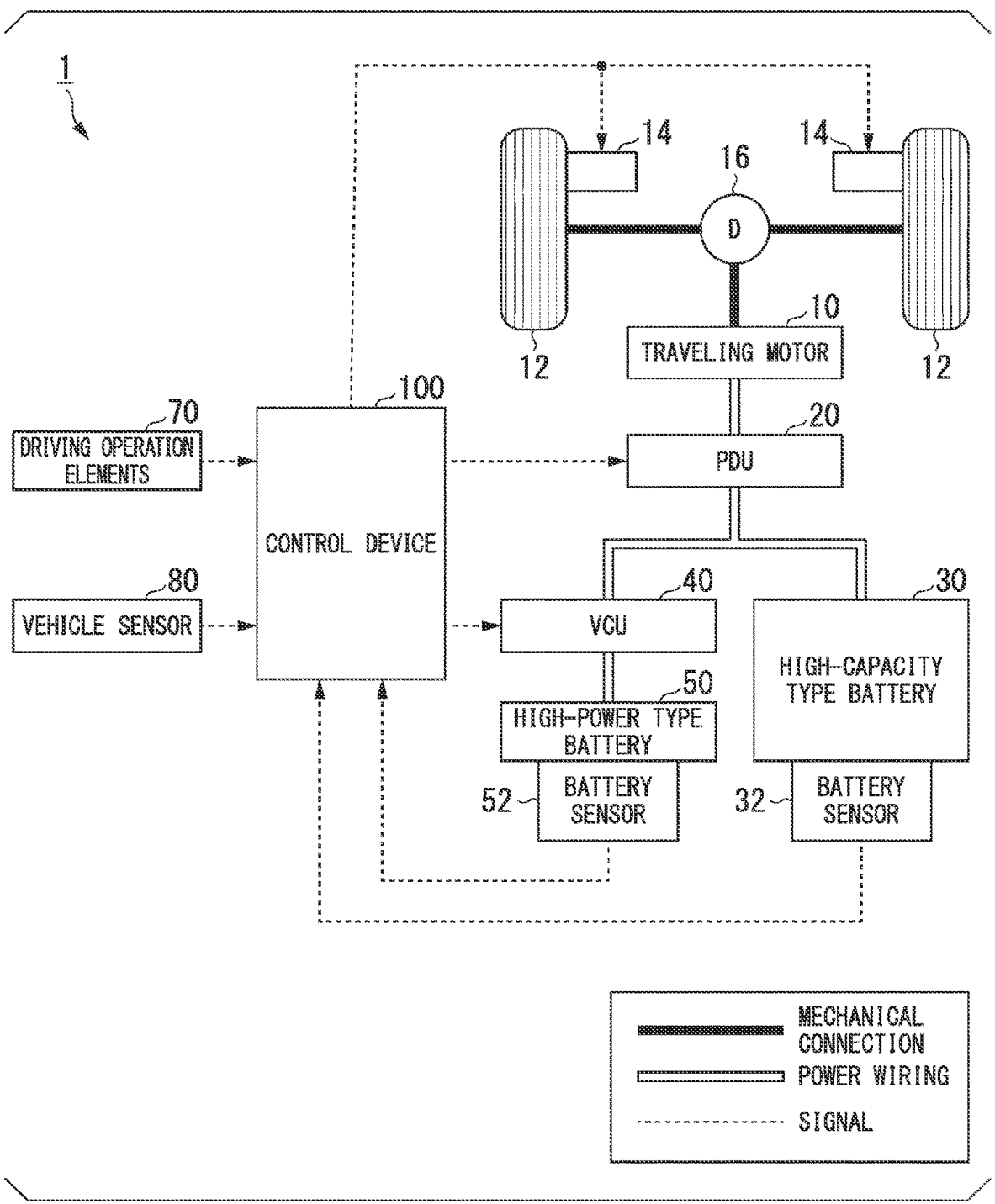
FIG. 1 is a diagram showing an example of a configuration of a vehicle according to an embodiment.

FIG. 1 is a diagram showing an example of a configuration of a vehicle according to an embodiment. A vehicle 1 is an electric vehicle (EV) (hereinafter simply referred to as a "vehicle") that travels using an electric motor driven by electric power supplied from a traveling battery (a secondary battery). The vehicle 1 is an electric vehicle of a multi-battery system equipped with two types of batteries including a high-capacity type battery having low power and high capacity and a high-power type battery having low capacity and high power. The vehicle 1 travels by driving the electric motor with the electric power supplied from one of the batteries or a combination of the electric power supplied from both batteries. Vehicles to which the present invention is applied include, for example, general four-wheeled vehicles, saddle-riding type two-wheeled vehicles, three-wheeled vehicles (including two front wheel and one rear wheel vehicles in addition to one front wheel and two rear wheel vehicles), and a vehicle that travels using an electric motor driven by electric power supplied from a traveling battery such as an assisted bicycle. The vehicle 1 may be, for example, a hybrid electric vehicle (HEV) that travels by further combining electric power supplied according to traveling of an internal combustion engine that uses fuel as an energy source, such as a diesel engine or a gasoline engine.

The vehicle 1 includes, for example, a traveling motor 10, a drive wheel 12, a brake device 14, a speed reducer 16, a power drive unit (PDU) 20, a high-capacity type battery 30, a battery sensor 32, a voltage control unit (VCU) 40, a high-power type battery 50, a battery sensor 52, a driving operation elements 70, a vehicle sensor 80, and a control device 100.

The traveling motor 10 is a rotating electric device for traveling of the vehicle 1. The traveling motor 10 is, for example, a three-phase alternating current (AC) electric motor. A rotor of the traveling motor 10 is connected to the speed reducer 16. The traveling motor 10 is driven (rotated) with electric power supplied from the high-capacity type battery 30 or electric power obtained by adding electric power supplied from the high-power type battery 50 via the VCU 40 to electric power supplied from the high-capacity type battery 30. The traveling motor 10 transfers its own rotational power to the speed reducer 16. The traveling motor 10 may operate as a regenerative brake using the kinetic energy of the vehicle 1 during deceleration to generate electricity. The traveling motor 10 is an example of a "motor" in the claims.

The brake device 14 arranged on the drive wheel 12 includes, for example, a brake caliper, a cylinder that transfers hydraulic pressure to the brake caliper, and an electric motor that causes a cylinder to generate the hydraulic pressure. The brake device 14 may include a mechanism for transferring the hydraulic pressure generated by an operation of a user (a driver) of the vehicle 1 on a brake pedal (not shown) to the cylinder via a master cylinder as a backup. The brake device 14 is not limited to the above-described configuration and may be an electronically controlled hydraulic brake device that transfers the hydraulic pressure of the master cylinder to the cylinder.

The speed reducer 16 is, for example, a differential gear. The speed reducer 16 causes a driving force of a shaft to which the traveling motor 10 is connected, i.e., rotational power of the traveling motor 10, to be transferred to an axle to which the drive wheel 12 is connected. The speed reducer 16 may include, for example, a so-called transmission mechanism in which a plurality of gears or shafts are combined to change the rotational speed of the traveling motor 10 in accordance with a gear ratio and cause the rotational speed to be transferred to the axle. The speed reducer 16 may also include, for example, a clutch mechanism that directly connects or separates the rotational power of the traveling motor 10 to or from the axle.

The PDU 20 is, for example, an AC-direct current (DC) converter. The PDU 20 converts DC power supplied from the high-capacity type battery 30 or supplied from the high-power type battery 50 via the VCU 40 in addition to the supply from the high-capacity type battery 30 into AC power for driving the traveling motor 10 and outputs the AC power to the traveling motor 10. The PDU 20 converts the AC power generated by the traveling motor 10 operating as a regenerative brake into DC power and outputs the DC power to the high-capacity type battery 30 or the VCU 40 (i.e., the high-power type battery 50). The PDU 20 may perform an output operation after a step-up or -down operation according to a power output destination.

The VCU 40 is, for example, a DC-DC converter. The VCU 40 steps up a voltage of the electric power supplied (discharged) from the high-power type battery 50 to a voltage similar to a voltage when the high-capacity type battery 30 supplies electric power to the PDU 20 and outputs the electric power whose voltage has been stepped up to the PDU 20. The VCU 40 steps down a voltage of the electric power generated by the traveling motor 10 operated as a regenerative brake output by the PDU 20, outputs the electric power whose voltage has been stepped down to the high-power type battery 50, and causes the high-power type battery 50 to store (to be charged with) the electric power whose voltage has been stepped down.

The high-capacity type battery 30 and the high-power type battery 50 are batteries each including a secondary battery capable of repeating charging and discharging processes as a power storage unit such as a lithium-ion battery. Each of the high-capacity type battery 30 and the high-power type battery 50 may have a removable configuration that can be easily attached to and detached from the vehicle 1 such as a cassette-type battery pack or a stationary configuration that is not easily attached to and detached from the vehicle 1. For example, the high-capacity type battery 30 has a stationary configuration and the high-power type battery 50 has a removable configuration. The secondary battery provided in each of the high-capacity type battery 30 and the high-power type battery 50 is, for example, a lithium-ion battery. As the secondary battery provided in each of the high-capacity type battery 30 and the high-power type battery 50, for example, in addition to a lead storage battery, a nickel-hydrogen battery, a sodium-ion battery, and the like, a capacitor such as an electric double-layer capacitor or a composite battery in which a secondary battery and a capacitor are combined is conceivable, but the configuration of the secondary battery may be of any type. Each of the high-capacity type battery 30 and the high-power type battery 50 stores (is charged with) the electric power introduced from an external charger (not shown) of the vehicle 1 and is discharged to output the stored electric power for causing the vehicle 1 to travel. Each of the high-capacity type battery 30 and the high-power type battery 50 stores (is charged with) the electric power supplied via the PDU 20 or the VCU 40 and generated by the traveling motor 10 operated as a regenerative brake and is discharged so that the stored electric power is used for traveling (for example, acceleration) of the vehicle 1. The high-capacity type battery 30 is an example of a "first battery" in the claims and the high-power type battery 50 is an example of a "second battery" in the claims.

The battery sensor 32 is connected to the high-capacity type battery 30. The battery sensor 32 detects physical quantities such as the voltage, the current, and the temperature of the high-capacity type battery 30. The battery sensor 32 includes, for example, a voltage sensor, a current sensor, and a temperature sensor. The battery sensor 32 detects the voltage of the high-capacity type battery 30 using the voltage sensor, detects the current of the high-capacity type battery 30 using the current sensor, and detects the temperature of the high-capacity type battery 30 using the temperature sensor. The battery sensor 32 outputs information (hereinafter referred to as "high-capacity type battery information") such as the voltage value, the current value, and the temperature of the high-capacity type battery 30 that have been detected to the control device 100.

The battery sensor 52 is connected to the high-power type battery 50. The battery sensor 52 detects physical quantities such as the voltage, the current, and the temperature of the high-power type battery 50. The configuration of the battery sensor 52 is similar to that of the battery sensor 32. The battery sensor 52 outputs information (hereinafter referred to as "high-power type battery information") such as the voltage value, the current value, and the temperature of the high-power type battery 50 that have been detected to the control device 100.

The driving operation elements 70 include, for example, an accelerator pedal, a brake pedal, a shift lever, a steering wheel, a variant steering wheel, a joystick, and other operation elements. The driving operation element 70 is equipped with a sensor that detects whether or not the user (the driver) of the vehicle 1 has performed an operation on each operation element or the amount of operation. The driving operation element 70 outputs a detection result of the sensor to the control device 100. For example, an accelerator opening degree sensor is attached to the accelerator pedal, detects the amount of operation on the accelerator pedal by the driver and outputs the detected amount of operation as an accelerator opening degree to the control device 100. For example, a brake depression amount sensor is attached to the brake pedal, detects the amount of operation on the brake pedal by the driver, and outputs the detected amount of operation as the amount of brake depression to the control device 100.

The vehicle sensor 80 detects the traveling state of the vehicle 1. The vehicle sensor 80 includes, for example, a vehicle speed sensor that detects the speed of the vehicle 1 or an acceleration sensor that detects the acceleration of the vehicle 1. The vehicle speed sensor may include, for example, wheel speed sensors and a speed calculator attached to drive wheels 12 of the vehicle 1, and may derive (detect) the speed (the vehicle speed) of the vehicle 1 by integrating wheel speeds detected by the wheel speed sensors. The vehicle sensor 80 may include, for example, a yaw rate sensor that detects an angular velocity around a vertical axis of the vehicle 1, a direction sensor that detects a direction of the vehicle 1, and the like. The vehicle sensor 80 outputs information (hereinafter referred to as "traveling state information") indicating the detected traveling state of the vehicle 1 to the control device 100.

The control device 100 controls traveling or operations of the PDU 20 and the VCU 40 in accordance with a detection result output by each sensor provided in the driving operation element 70, i.e., an operation on each operation element by the user (the driver) of the vehicle 1. For example, the control device 100 controls the traveling or operations of the PDU 20 and the VCU 40 in accordance with the accelerator opening degree detected by the accelerator opening degree sensor. At this time, the control device 100 controls the traveling or operations of the PDU 20 and the VCU 40, for example, in consideration of the vehicle speed included in the traveling state information output by the vehicle sensor 80 and the like. The control device 100 may control the traveling or operations of the PDU 20 and the VCU 40, for example, in consideration of the gear ratio of the transmission mechanism controlled by the control device 100 and the like. Thereby, the control device 100 controls the amount of electric power that is supplied to the traveling motor 10, i.e., a driving force of the traveling motor 10.

The control device 100 may include, for example, separate control devices such as a motor controller, a PDU controller, a battery controller, and a VCU controller. For example, the control device 100 may be replaced with a control device such as a motor electronic control unit (ECU), a PDU-ECU, a battery ECU, or a VCU-ECU.

Each of the control device 100, the motor controller constituting the control device 100, the PDU controller, the battery controller, and the VCU controller may be implemented, for example, by a hardware processor such as a central processing unit (CPU) executing the program (software). Some or all of the functions of these components may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Some or all of the functions of these components may be implemented by a dedicated LSI circuit. The program may be pre-stored in a storage device (a storage device including a non-transitory storage medium) such as a hard disk drive (HDD) or a flash memory provided in the vehicle 1 or may be stored in a removable storage medium (a non-transitory storage medium) such as a DVD or a CD-ROM and installed in the HDD or the flash memory provided in the vehicle 1 when the storage medium is mounted in a drive device provided in the vehicle 1.

The control device 100 controls a discharging process on electric power from the high-capacity type battery 30, a charging process on electric power to the high-capacity type battery 30, a discharging process on electric power from the high-power type battery 50, and a charging process on electric power to the high-power type battery 50 on the basis of a traveling mode of the vehicle 1. Traveling modes of the vehicle 1 are, for example, at least three traveling modes including a one-battery traveling mode, a multi-battery traveling mode, and a performance-priority traveling mode. The traveling mode of the vehicle 1 may be automatically switched by the control device 100 on the basis of the accelerator opening degree and the amount of brake depression output by the driving operation elements 70 and the traveling state information output by the vehicle sensor 80 or may be manually and intentionally switched by the driver using, for example, a traveling mode changeover switch (not shown) provided in the driving operation element 70. When the driver manually switches the traveling mode, the traveling mode changeover switch (not shown) outputs information of a traveling mode set (designated) by the driver (hereinafter referred to as "traveling mode information") to the control device 100.

The one-battery traveling mode is a traveling mode in which the vehicle 1 is allowed to travel by driving the traveling motor 10 only with electric power supplied (discharged) from the high-capacity type battery 30 (i.e., only the electric power of one battery) when the vehicle 1 is allowed to perform normal traveling. In the one-battery traveling mode, the control device 100 does not cause the VCU 40 to output the electric power stored in the high-power type battery 50 to the PDU 20. Thereby, only the electric power stored in the high-capacity type battery 30 is output to the PDU 20 and the vehicle 1 travels with the rotational power of the traveling motor 10 driven only with the electric power from the high-capacity type battery 30 output from the PDU 20.

The multi-battery traveling mode is a traveling mode in which the vehicle 1 is allowed to travel by driving the traveling motor 10 with a combination of electric power supplied (discharged) from the high-capacity type battery 30 and the high-power type battery 50 (i.e., a combination of electric power of the two batteries) when the vehicle 1 is allowed to perform normal driving. In the multi-battery traveling mode, an insufficient amount of electric power is compensated for with the amount of electric power output from the high-power type battery 50 when the amount of electric power required to drive the traveling motor 10 with a driving force according to the amount of operation on the accelerator pedal by the driver exceeds an upper limit value of electric power capable of being output by the high-capacity type battery 30 (hereinafter referred to as "an upper power limit value"). Thus, in the multi-battery traveling mode, if the driving force of the traveling motor 10 required for traveling of the vehicle 1 is small, for example, when the vehicle 1 is stopped, when the vehicle 1 travels on flat ground or climbs a gentle slope, or the like (if the electric power does not exceed the upper power limit value), the control device 100 does not cause the VCU 40 to output the electric power stored in the high-power type battery 50 to the PDU 20 as in the case of the one-battery traveling mode. Thereby, as in the one-battery traveling mode, only the electric power stored in the high-capacity type battery 30 is output to the PDU 20 and the vehicle 1 travels with the rotational power of the traveling motor 10 driven only with electric power from the high-capacity type battery 30 output from the PDU 20. On the other hand, in the multi-battery traveling mode, if the driving force of the traveling motor 10 required for traveling of the vehicle 1 is large, for example, when the vehicle 1 climbs a steep slope or accelerates or the like, the control device 100 causes the VCU 40 to output the required amount of electric power exceeding the upper power limit value of the high-capacity type battery 30 from the high-power type battery 50 to the PDU 20. Thereby, in addition to the electric power stored in the high-capacity type battery 30, the electric power stored in the high-power type battery 50 is output to the PDU 20 via the VCU 40 and the vehicle 1 travels with rotational power of the traveling motor 10 driven with a combination of electric power from the high-capacity type battery 30 and electric power from the high-power type battery 50 output from the PDU 20. The upper power limit value can be calculated on the basis of the high-capacity type battery information output by the battery sensor 32. More specifically, for example, it is possible to obtain a state of charge (SOC) indicating a charging state of the high-capacity type battery 30 on the basis of the voltage value and the current value included in the high-capacity type battery information and calculate an upper power limit value at a current time point in the high-capacity type battery 30 on the basis of information of the obtained SOC and a temperature included in the high-capacity type battery information.

A performance-priority traveling mode is a traveling mode in which traveling having excellent traveling performance is performed in the vehicle 1 so that the driver is allowed to experience (actually feel) a difference from normal traveling performance in the vehicle 1, for example, such as acceleration performance of the vehicle 1. The performance-priority traveling mode is, for example, a traveling mode called a sports mode or the like. Even in the performance-priority traveling mode, as in the multi-battery traveling mode, the traveling motor 10 is driven with a combination of electric power of the two batteries. However, in the performance-priority traveling mode, the traveling motor 10 is driven with a large driving force so that the traveling performance of the vehicle 1 is improved. Thus, the control device 100 causes the VCU 40 to intentionally and positively output the electric power stored in the high-power type battery 50 to the PDU 20 without causing electric power stored in the high-power type battery 50 to be output to the PDU 20 for the purpose of compensating for an insufficient amount of electric power only with electric power supplied from the high-capacity type battery 30. At this time, the control device 100 causes electric power to be added until the electric power reaches a limit value of the amount of electric power capable of being supplied to the traveling motor 10 (hereinafter referred to as a power limit value) without limiting the amount of electric power to be output from the high-power type battery 50 to the shortage from the upper power limit value of the high-capacity type battery 30 as in the multi-battery traveling mode. Thus, the control device 100 causes electric power to be output from each of the high-capacity type battery 30 and the high-power type battery 50 until the electric power reaches the upper power limit value at the maximum. Thereby, a large amount of electric power obtained by adding the electric power of the high-power type battery 50 output via the VCU 40 to the electric power output from the high-capacity type battery 30 is output to the PDU 20 and the vehicle 1 travels with the high rotational power of the traveling motor 10 driven with high electric power output from the PDU 20.

In this way, the control device 100 controls the running and operations of the PDU 20 and the VCU 40 in each traveling mode in accordance with the operation performed on the driving operation element 70 by the driver and causes the traveling motor 10 to be driven by outputting electric power from the high-capacity type battery 30 and the high-power type battery 50.

The control device 100 is an example of a "vehicle control device" in the claims. The performance-priority traveling mode is an example of a "first traveling mode" in the claims. The one-battery traveling mode and the multi-battery traveling mode are examples of the "another traveling mode" in the claims. The one-battery traveling mode is an example of a "second traveling mode" in the claims and the multi-battery traveling mode is an example of a "third traveling mode" in the claims. In the following description, the one-battery traveling mode and the multi-battery traveling mode are not distinguished between and are referred to as "normal traveling modes."

[Control of Power Supply to Traveling Motor]

Incidentally, as described above, the performance-priority traveling mode is a traveling mode in which the driver is allowed to experience (actually feel) a traveling performance difference from the normal traveling mode. The maximum value of the driving force of the traveling motor 10 (hereinafter referred to as a "motor-specific maximum driving force") is a fixed value determined according to a standard (specification) of the traveling motor 10 and it is possible to cause the traveling motor 10 to be driven with the motor-specific maximum driving force in any traveling mode if electric power of a power limit value can be supplied to the traveling motor 10 (i.e., if the SOCs of the high-capacity type battery 30 and the high-power type battery 50 are sufficient). Thus, the control device 100 intentionally makes the driving force of the traveling motor 10 different so that the traveling performance is different between the normal traveling mode and the performance-priority traveling mode. That is, the control device 100 makes a supply amount of electric power from the PDU 20 to the traveling motor 10 different between the normal traveling mode and the performance-priority traveling mode.

Figure 2:
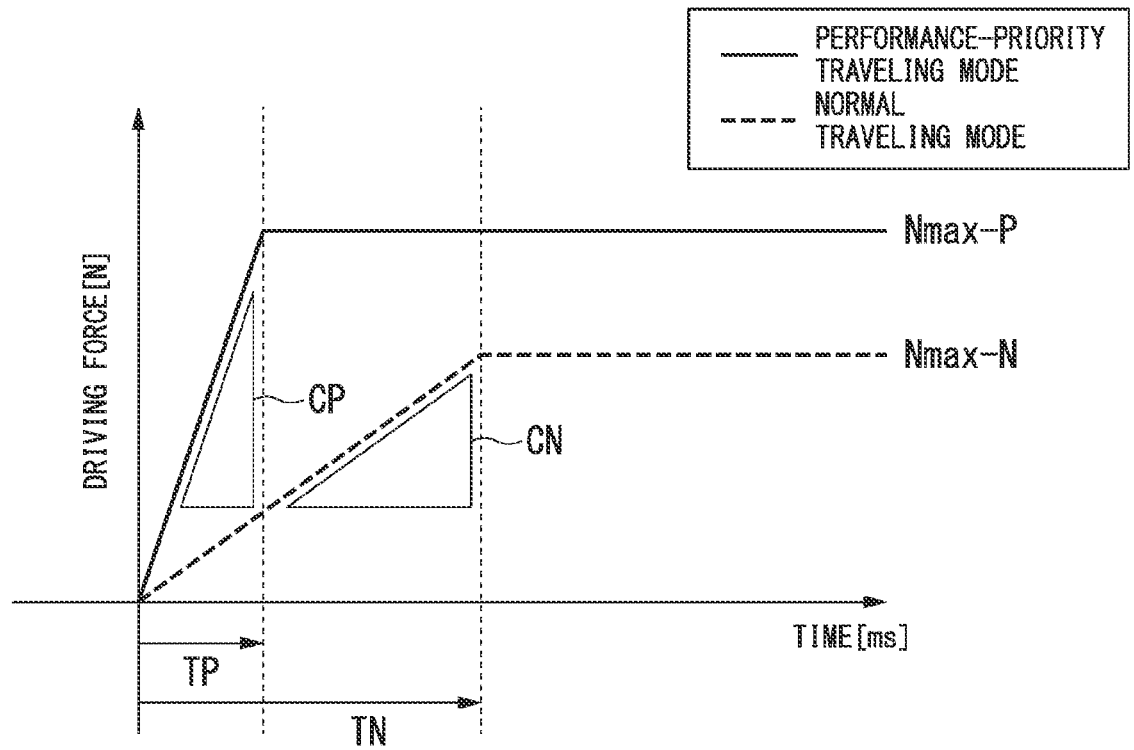
FIG. 2 is a diagram showing an example of a change in a driving force of a traveling motor provided in a vehicle according to the embodiment.
Figure 3:
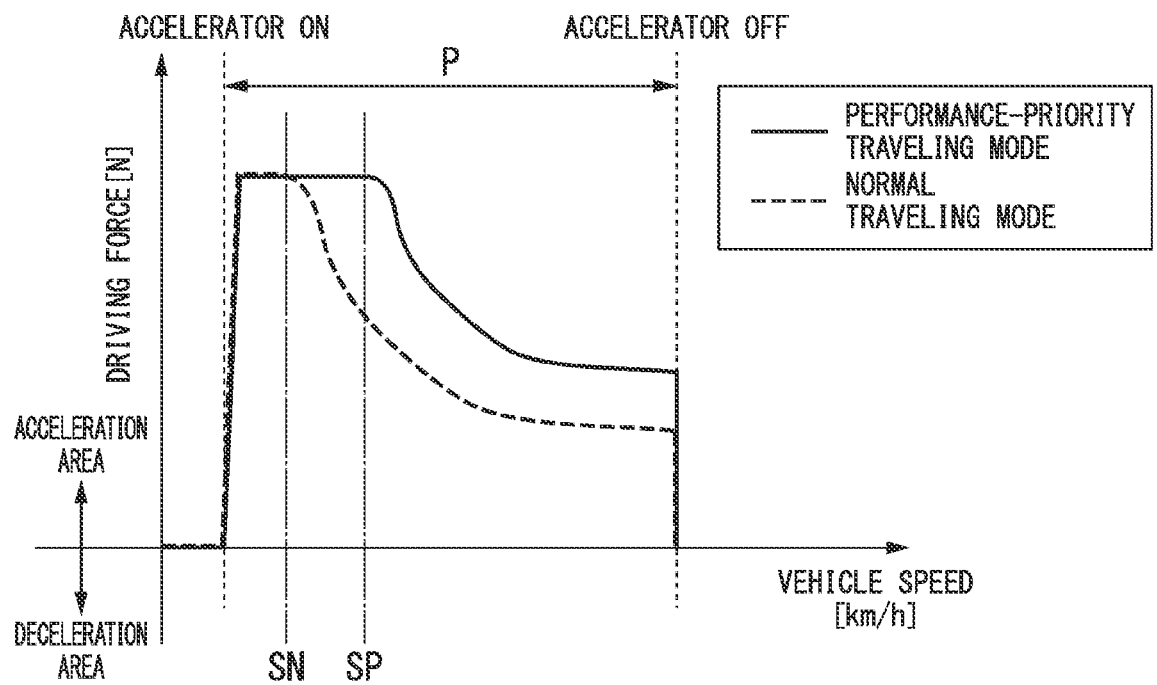
FIG. 3 is a diagram showing another example of a change in the driving force of the traveling motor provided in the vehicle according to the embodiment.

FIGS. 2 and 3 are diagrams showing an example of a change in the driving force of the traveling motor 10 provided in the vehicle 1 according to the embodiment. The control device 100 controls the driving force of the traveling motor 10 on the basis of the accelerator opening degree, the gear ratio, the vehicle speed, and the like as described above, but it is assumed that the accelerator opening degree, the gear ratio, or the like does not change during control in the following description.

First, an example in which the control device 100 controls the driving force of the traveling motor 10 will be described with reference to FIG. 2. In FIG. 2, an example in which the control device 100 controls the amount of electric power to be supplied to the traveling motor 10 and therefore a change in a driving force [N] of the traveling motor 10 with respect to a time period [ms] is made different between the normal traveling mode and the performance-priority traveling mode is shown. The driving force [N] of the traveling motor 10 corresponds to, for example, torque in an internal combustion engine such as an engine, but the control device 100 makes a change by controlling the amount of electric power to be supplied from the PDU 20 to the traveling motor 10 in the vehicle 1.

The control device 100 performs a control process so that the maximum driving force (hereinafter referred to as a "control-specific maximum driving force") Nmax of the traveling motor 10 in each traveling mode is different. More specifically, the control device 100 controls a supply amount of electric power to be output to the traveling motor 10 by the PDU 20 so that a control-specific maximum driving force Nmax–P of the traveling motor 10 in the performance-priority traveling mode becomes greater than a control-specific maximum driving force Nmax–N of the traveling motor 10 in the normal traveling mode.

Further, the control device 100 performs a control process so that a time period required for the driving force of the traveling motor 10 to reach the control-specific maximum driving force Nmax is different in each traveling mode. More specifically, the control device 100 controls a supply amount of electric power to be output to the traveling motor 10 by the PDU 20 so that a time period TP required for the driving force of the traveling motor 10 to reach the control-specific maximum driving force Nmax-P in the performance-priority traveling mode is shorter than a time period TN required for the driving force of the traveling motor 10 to reach the control-specific maximum driving force Nmax-N in the normal traveling mode. That is, the control device 100 controls a supply amount of electric power to be output to the traveling motor 10 so that an inclination CP of a change in the driving force of the traveling motor 10 in the performance-priority traveling mode becomes larger (becomes steeper) than an inclination CN of a change in the driving force of the traveling motor 10 in the normal traveling mode. For example, the control device 100 controls the supply amount of electric power for the traveling motor 10 so that the time period TP is several hundred milliseconds [ms] and the time period TN is several times the time period TP. For example, the control device 100 controls a supply amount of electric power for the traveling motor 10 so that the inclination CP is greater than or equal to an inclination that is several times the inclination CN. The time period TP is an example of a "first time period" in the claims and the time period TN is an example of a "second time period" in the claims.

Next, another example in which the control device 100 controls the driving force of the traveling motor 10 will be described with reference to FIG. 3. In FIG. 3, an example in which the control device 100 controls a supply amount of electric power for the traveling motor 10 and therefore a change in the driving force [N] of the traveling motor 10 with respect to a vehicle speed [Km/h] is made different between the normal traveling mode and the performance-priority traveling mode is shown. The vehicle speed [Km/h] may be a wheel speed detected by the wheel speed sensor attached to the drive wheel 12.

The control device 100 controls a supply amount of electric power to be output to the traveling motor 10 by the PDU 20 so that the change in the driving force of the traveling motor 10 is different between the normal traveling mode and the performance-priority traveling mode when the vehicle 1 is accelerated in an accelerator ON period P in which an operation on the accelerator pedal is performed (in this regard, the accelerator opening degree is uniform) in accordance with an operation (depression) performed on the accelerator pedal by the driver when the traveling motor 10 is driven with the same driving force. The control device 100 causes the driving force of the traveling motor 10 to change in accordance with the vehicle speed [Km/h] of the vehicle 1. At this time, the control device 100 performs a control process so that a timing for reducing the driving force of the traveling motor 10 as the vehicle speed increases (becomes fast) is later in the performance-priority traveling mode than in the normal traveling mode. More specifically, the supply amount of electric power to be output to the traveling motor 10 by the PDU 20 is controlled so that a speed SP at a timing when the driving force of the traveling motor 10 in the performance-priority traveling mode is reduced is higher than a speed SN at a timing when the driving force of the traveling motor 10 is reduced in the normal traveling mode. For example, even if acceleration starts from the accelerator ON state and the driving force of the traveling motor 10 is controlled in the same way in the normal traveling mode and the performance-priority traveling mode until the driving force of the traveling motor 10 becomes the control-specific maximum driving force, the control device 100 subsequently controls the supply amount of electric power for the traveling motor 10 so that a vehicle speed difference until the speed becomes a speed SP for reducing the driving force of the traveling motor 10 is larger than the vehicle speed difference until the speed becomes a speed SN. Subsequently, the rate at which the control device 100 reduces the driving force of the traveling motor 10 in accordance with the vehicle speed may be the same or different between the traveling modes.

In this way, the control device 100 causes the supply amount of electric power from the PDU 20 to be different and therefore a driving force change difference appears between the normal traveling mode and the performance-priority traveling mode in the traveling motor 10. Thereby, the driver who gets into the vehicle 1 and performs a driving process can experience (actually feel) a traveling performance difference of the vehicle 1 between the performance-priority traveling mode and the normal traveling mode such as an acceleration feeling or the extension of the acceleration of the vehicle 1.

[Configuration of Control Device]

Figure 4:
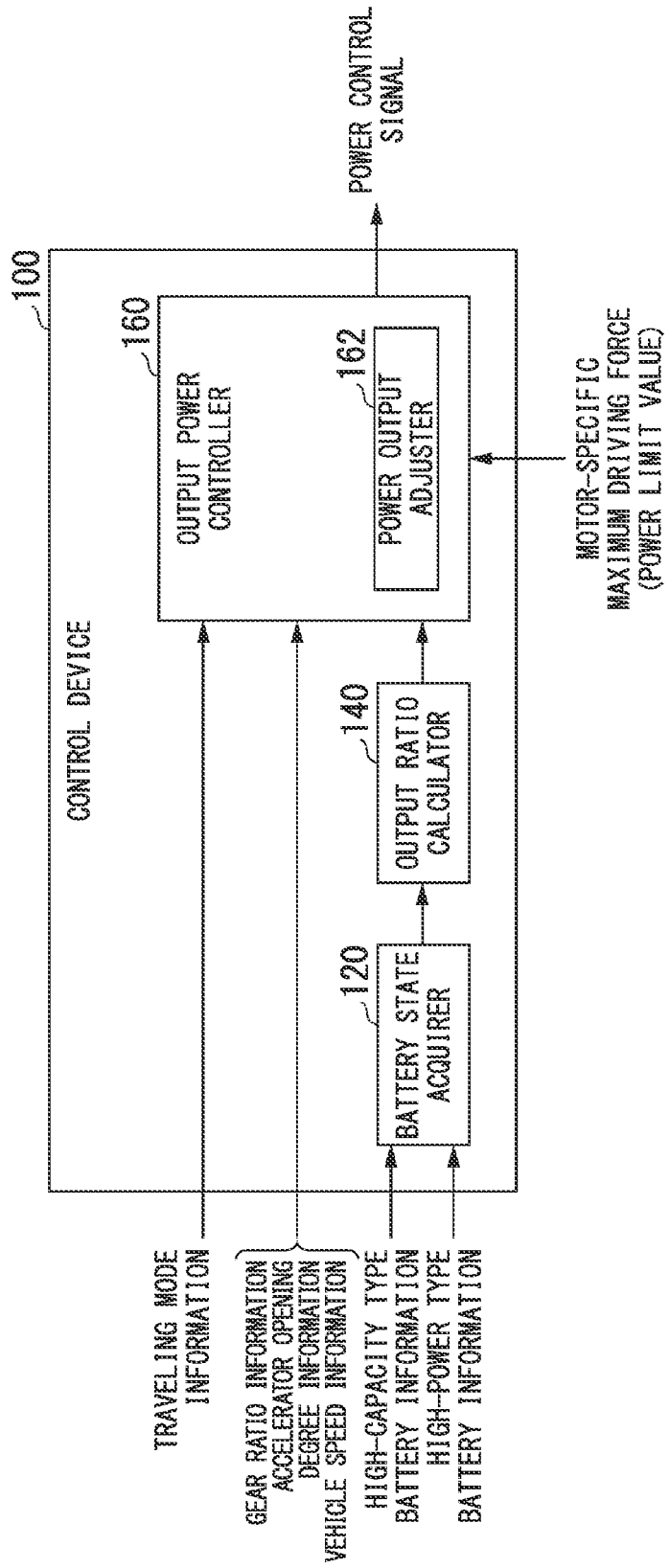
FIG. 4 is a diagram showing an example of a configuration of a control device provided in the vehicle according to the embodiment.

FIG. 4 is a diagram showing an example of a configuration of the control device 100 provided in the vehicle 1 according to the embodiment. The control device 100 includes, for example, a battery state acquirer 120, an output ratio calculator 140, and an output power controller 160. The output power controller 160 includes a power output adjuster 162. In FIG. 4, components of the control device 100 related to the control of the driving force of the traveling motor 10 are shown.

The battery state acquirer 120 acquires high-capacity type battery information output by the battery sensor 32 and high-power type battery information output by the battery sensor 52. The battery state acquirer 120 outputs the acquired high-capacity type battery information and the acquired high-power type battery information to the output ratio calculator 140.

The output ratio calculator 140 calculates a ratio (hereinafter referred to as a "power output ratio") between amounts of electric power to be supplied (output) from the high-capacity type battery 30 and the high-power type battery 50 to the traveling motor 10 on the basis of the high-capacity type battery information and the high-power type battery information output by the battery state acquirer 120. At this time, the output ratio calculator 140 calculates a current SOC (a high-capacity type battery-specific SOC) of the high-capacity type battery 30 on the basis of a voltage value and a current value included in the high-capacity type battery information and calculates an upper power limit value (hereinafter referred to as a "high-capacity type upper power limit value") of the high-capacity type battery 30 on the basis of the calculated high-capacity type battery-specific SOC and information of a temperature included in the high-capacity type battery information. Further, the output ratio calculator 140 calculates a current SOC (a high-power type battery-specific SOC) of the high-power type battery 50 on the basis of a voltage value and a current value included in the high-power type battery information and calculates an upper power limit value (hereinafter referred to as a "high-power type upper power limit value") of the high-power type battery 50 on the basis of the calculated high-power type battery-specific SOC and information of a temperature included in the high-power type battery information. The output ratio calculator 140 may further calculate the high-capacity type upper power limit value and the high-power type upper power limit value using an internal resistance value of a corresponding battery included in battery information. Each of the high-capacity type battery-specific SOC and the high-power type battery-specific SOC may be calculated by the battery state acquirer 120 and output to the output ratio calculator 140 together with the high-capacity type battery information or the high-power type battery information. Subsequently, the output ratio calculator 140 calculates a total upper power limit value of electric power capable of being supplied to the traveling motor 10 on the basis of the calculated high-capacity type upper power limit value and the calculated high-power type upper power limit value. The output ratio calculator 140 calculates a power output ratio on the basis of the calculated high-capacity type upper power limit value and the calculated high-power type upper power limit value. More specifically, the output ratio calculator 140 calculates the power output ratio by dividing the high-capacity type upper power limit value by the total upper power limit value. The output ratio calculator 140 outputs information of the calculated power output ratio to the output power controller 160.

The output power controller 160 controls electric power to be output (supplied) from the PDU 20 to the traveling motor 10 on the basis of the traveling mode information of the vehicle 1, the motor-specific maximum driving force of the traveling motor 10, and the power output ratio information output by the output ratio calculator 140. At this time, the output power controller 160 determines the maximum amount of electric power to be output to the traveling motor 10. In other words, the output power controller 160 determines a control-specific maximum driving force of the traveling motor 10. The traveling mode information of the vehicle 1 is, for example, traveling mode information output by a traveling mode changeover switch (not shown). The motor-specific maximum driving force of the traveling motor 10 is a fixed value determined by the standard of the traveling motor 10. The output power controller 160 may use a power limit value instead of the motor-specific maximum driving force. When the control-specific maximum driving force is determined, the output power controller 160 also considers gear ratio information of the transmission mechanism, accelerator opening degree information, vehicle speed information, and the like. When the traveling mode of the vehicle 1 is the performance-priority traveling mode, the output power controller 160 determines the control-specific maximum driving force as the motor-specific maximum driving force. On the other hand, when the traveling mode of the vehicle 1 is the normal traveling mode, the output power controller 160 determines the control-specific maximum driving force as a driving force obtained by multiplying the motor-specific maximum driving force by the power output ratio.

The power output adjuster 162 calculates (adjusts) a time period until the electric power to be output from the PDU 20 to the traveling motor 10 reaches the maximum amount of electric power determined by the output power controller 160 and determines this time period as a change time period. In other words, the power output adjuster 162 determines the amount of change until the driving force of the traveling motor 10 changes to the control-specific maximum driving force determined by the output power controller 160. At this time, the power output adjuster 162 calculates the change time period so that the amount of electric power becomes the maximum amount of electric power until a time period becomes a target time period of a change in the driving force of the traveling motor 10 preset with respect to each traveling mode of the vehicle 1. The target time period is, for example, a time period that defines the inclination CP and the inclination CN shown in FIG. 2. Thereby, the power output adjuster 162 determines the change time period until the driving force of the traveling motor 10 becomes the control-specific maximum driving force, for example, such as the time period TP or the time period TN shown in FIG. 2.

The power output adjuster 162 may assume a time period until the driving force becomes the control-specific maximum driving force in the normal traveling mode on the basis of the maximum driving force of the traveling motor 10 preset for the normal traveling mode or the target time period and determine a change time period in which there is a difference of a prescribed value or more from the assumed time period (for example, a fraction of the time period) when the traveling mode of the vehicle 1 is the performance-priority traveling mode.

The output power controller 160 generates a power control signal for outputting electric power to the traveling motor 10 in accordance with the change time period determined (adjusted) by the power output adjuster 162. At this time, the output power controller 160 generates a power control signal for making a change from a current driving force of the traveling motor 10 based on the power control signal generated in a previous process to the determined control-specific maximum driving force. The output power controller 160 outputs the generated power control signal to the PDU 20 and the VCU 40. Thereby, the PDU 20 and the VCU 40 cause the electric power according to the power control signal to be output from the high-capacity type battery 30 or the high-power type battery 50. The PDU 20 outputs electric power output from the high-capacity type battery 30 or electric power obtained by adding electric power output from the high-power type battery 50 via the VCU 40 to electric power output from the high-capacity type battery 30 to the traveling motor 10. Thereby, the traveling motor 10 is driven with a driving force according to the electric power output from the PDU 20.

Figure 5:
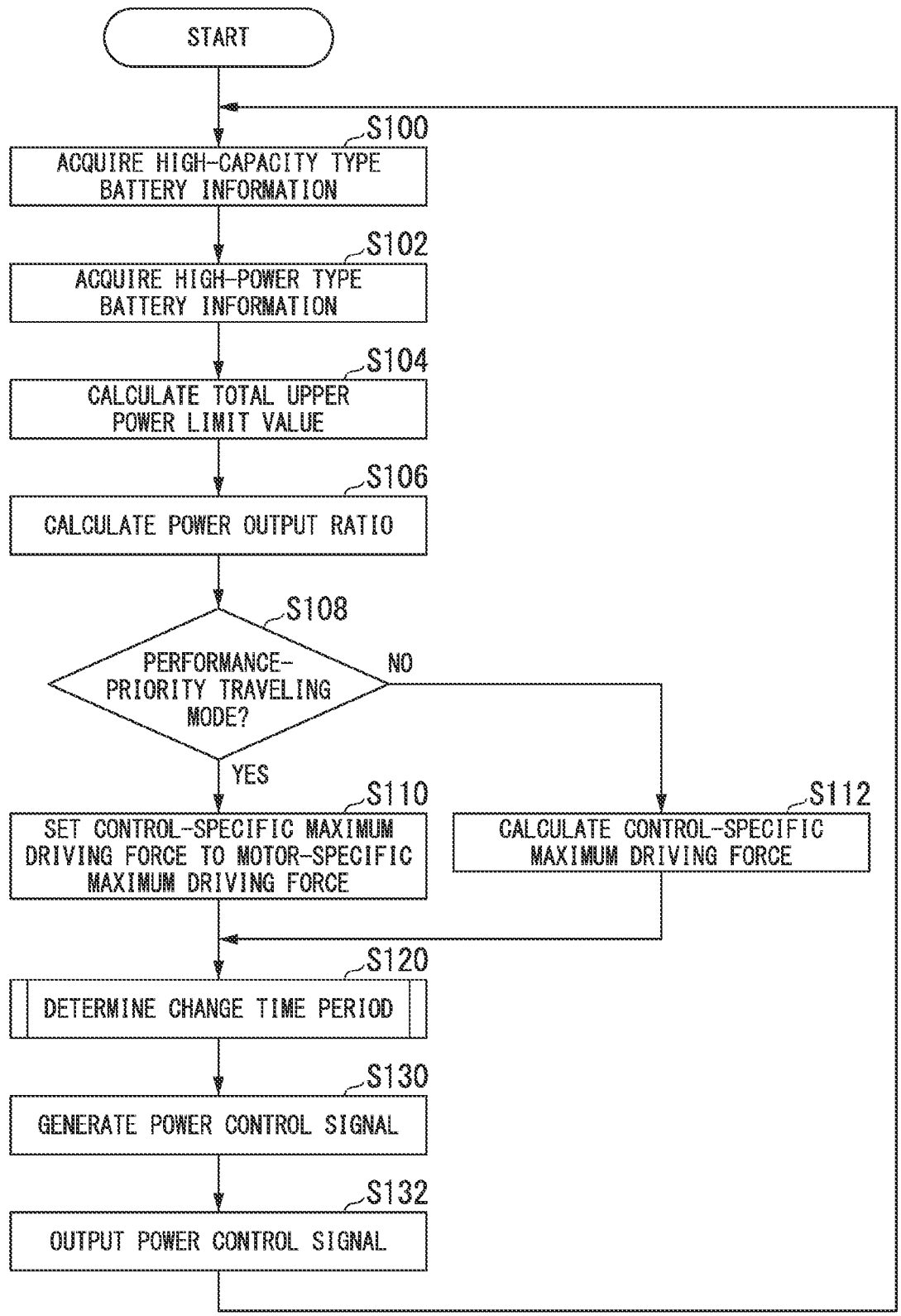
FIG. 5 is a flowchart showing an example of a flow of a process executed when the driving force of the traveling motor is controlled in the control device provided in the vehicle according to the embodiment.
Figure 6:
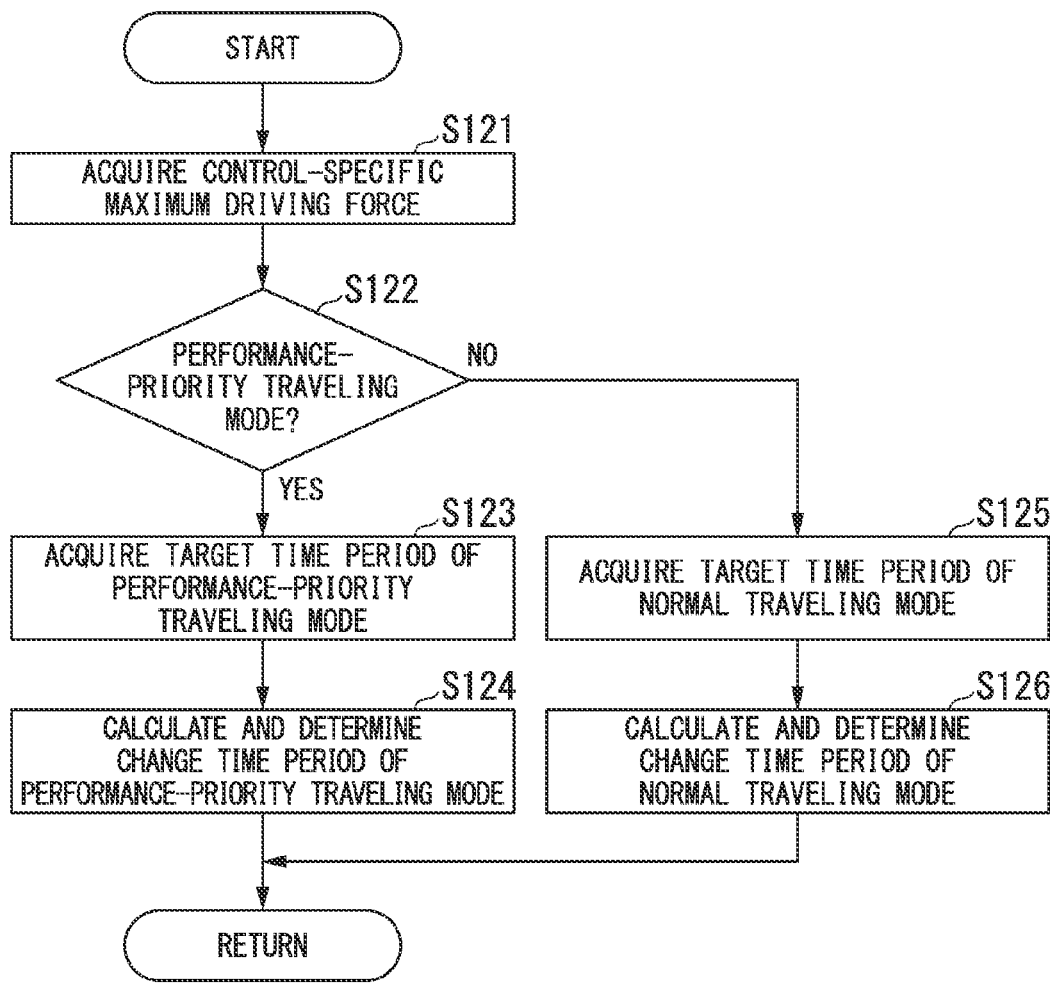
FIG. 6 is a flowchart showing an example of a flow of a process executed when the driving force of the traveling motor is controlled in the control device provided in the vehicle according to the embodiment.

[Process of Control Device] FIGS. 5 and 6 are flowcharts showing an example of a flow of a process executed when the driving force of the traveling motor 10 is controlled in the control device 100 provided in the vehicle 1 according to the embodiment. In FIG. 5, the entire process until the output power controller 160 determines the control-specific maximum driving force and outputs the power control signal is shown. In FIG. 6, a process of adjusting the change time period performed by the power output adjuster 162 in the entire process shown in FIG. 5 is shown. The process of the present flowchart is iterated executed while the vehicle 1 is traveling.

First, a process in which the output power controller 160 determines a control-specific maximum driving force will be described with reference to FIG. 5. The battery state acquirer 120 acquires high-capacity type battery information output by the battery sensor 32 (step S100). The battery state acquirer 120 outputs the acquired high-capacity type battery information to the output ratio calculator 140. Further, the battery state acquirer 120 acquires high-power type battery information output by the battery sensor 52 (step S102). The battery state acquirer 120 outputs the acquired high-power type battery information to the output ratio calculator 140.

The output ratio calculator 140 calculates a total upper power limit value on the basis of a high-capacity type upper power limit value and a high-power type upper power limit value calculated on the basis of the high-capacity type battery information and the high-power type battery information output by the battery state acquirer 120 (step S104). Further, the output ratio calculator 140 calculates a power output ratio on the basis of the calculated total upper power limit value and the high-capacity type upper power limit value (step S106). The output ratio calculator 140 outputs information of the calculated power output ratio to the output power controller 160.

The output power controller 160 confirms whether or not the traveling mode of the vehicle 1 is the performance-priority traveling mode (step S108). When it is confirmed that the traveling mode of the vehicle 1 is the performance-priority traveling mode in step S108, the output power controller 160 sets the control-specific maximum driving force to the motor-specific maximum driving force (step S110). On the other hand, when it is confirmed that the traveling mode of the vehicle 1 is not the performance-priority traveling mode in step S108, the output power controller 160 calculates a driving force obtained by multiplying the motor-specific maximum driving force by the power output ratio as the control-specific maximum driving force (step S112).

When it is confirmed that the traveling mode of the vehicle 1 is not the performance-priority traveling mode in the processing of step S108, i.e., that the traveling mode of the vehicle 1 is the normal traveling mode, the output power controller 160 may further confirm whether the traveling mode of the vehicle 1 is the multi-battery traveling mode or the one-battery traveling mode. When the traveling mode of the vehicle 1 is the multi-battery traveling mode, the output power controller 160 may use the driving force calculated in the processing of step S112 as the control-specific maximum driving force. In this case, the output power controller 160 may provide a prescribed upper limit value for the control-specific maximum driving force, i.e., an upper limit of the amount of electric power to be output to the traveling motor 10. On the other hand, when the traveling mode of the vehicle 1 is the one-battery traveling mode, the output power controller 160 may use a driving force when electric power of the high-capacity type upper power limit value calculated by the output ratio calculator 140 has been output to the traveling motor 10 as the control-specific maximum driving force.

The power output adjuster 162 determines a change time period for changing the driving force of the traveling motor 10 to the control-specific maximum driving force determined by the output power controller 160 (step S120). Here, the process of determining the change time period in the power output adjuster 162 will be described with reference to FIG. 6.

When the control-specific maximum driving force is determined by the output power controller 160, the power output adjuster 162 acquires information of the control-specific maximum driving force (step S121).

The power output adjuster 162 confirms whether or not the traveling mode of the vehicle 1 is the performance-priority traveling mode (step S122). The confirmation in the processing of step S122 may be omitted, for example, when it is known whether the control-specific maximum driving force determined by the output power controller 160 corresponds to the normal traveling mode or the performance-priority traveling mode.

When it is confirmed that the traveling mode of the vehicle 1 is the performance-priority traveling mode in step S122, the power output adjuster 162 acquires a target time period corresponding to the performance-priority traveling mode (step S123). The power output adjuster 162 calculates and determines a change time period for the performance-priority traveling mode on the basis of the control-specific maximum driving force and the target time period that have been acquired (step S124). The power output adjuster 162 returns the process.

On the other hand, when it is confirmed that the traveling mode of the vehicle 1 is not the performance-priority traveling mode in step S122, i.e., the traveling mode of the vehicle 1 is the normal traveling mode, the power output adjuster 162 acquires a target time period corresponding to the normal traveling mode (step S125). The power output adjuster 162 calculates and determines a change time period for the normal traveling mode on the basis of the control-specific maximum driving force and the target time period that have been acquired (step S126). The power output adjuster 162 returns the process.

The acquisition of the target time period in the above-described processing of steps S123 and S125 may be performed before the processing of step S122. In this case, the power output adjuster 162 acquires the target time period corresponding to all the traveling modes in the vehicle 1.

Returning to FIG. 5, the output power controller 160 generates a power control signal for outputting electric power to the traveling motor 10 in accordance with the change time period determined (adjusted) by the power output adjuster 162 (step S130). The output power controller 160 outputs the generated power control signal to the PDU 20 and the VCU 40 (step S132).

According to such a flow of a process, the control device 100 performs a control process of making the supply amount of electric power from the PDU 20 to the traveling motor 10 different according to whether the traveling mode of the vehicle 1 is the normal traveling mode or the performance-priority traveling mode and causes the traveling motor 10 to be driven so that a traveling performance difference appears between the normal traveling mode and the performance-priority traveling mode.

As described above, according to the vehicle 1 of the embodiment, the control device 100 makes the driving force of the traveling motor 10 different between the normal traveling mode and the performance-priority traveling mode in the vehicle 1. Thereby, the driver who gets into the vehicle 1 and performs a driving process can experience (actually feel) a difference in traveling performance of the vehicle 1 (for example, acceleration performance such as an acceleration feeling or the extension of the acceleration of the vehicle 1) from the normal traveling mode when the traveling mode of the host vehicle M is the performance-priority traveling mode.

In the embodiment, a case where the control device 100 controls a supply amount of electric power to be supplied to the PDU 20 so as to drive the traveling motor 10 so that a traveling performance difference appears according to whether the traveling mode of the vehicle 1 is the normal traveling mode or the performance-priority traveling mode has been described. However, it is conceivable that the vehicle 1 has various traveling modes other than the above-described traveling modes (the one-battery traveling mode, the multi-battery traveling mode, and the performance-priority traveling mode). In this case, the control of the supply amount of electric power in the control device 100 can be similar to control in the above-described embodiment. It is only necessary for the configuration, operation, process, and the like of the control device 100 in this case to be equivalent to the configuration, operation, process, and the like of the above-described embodiment.

According to the above-descried embodiment, the vehicle 1 includes the battery state acquirer 120 configured to acquire a state of a high-capacity type battery 30 and a state of a high-power type battery 50 having lower capacity and higher power than the high-capacity type battery 30; the output ratio calculator 140 configured to calculate a high-capacity type upper power limit value that is an upper power limit value of the high-capacity type battery 30 on the basis of the state of the high-capacity type battery 30, calculate a high-power type upper power limit value that is an upper power limit value of the high-power type battery 50 on the basis of the state of the high-power type battery 50, and calculate a power output ratio that is a ratio between amounts of electric power to be supplied from the high-capacity type battery 30 and the high-power type battery 50 to the traveling motor 10 that outputs motive power for traveling on the basis of the high-capacity type upper power limit value and the high-power type upper power limit value that have been calculated; and the output power controller 160 configured to control electric power to be output to the traveling motor 10 on the basis of traveling modes of a vehicle including a performance-priority traveling mode in which traveling performance has at least higher priority than that in another traveling mode and a normal traveling mode different from the performance-priority traveling mode, the maximum driving force in the traveling motor 10, and the power output ratio, wherein the output power controller 160 causes the maximum amount of electric power to be different on the basis of whether or not the traveling mode is the performance-priority traveling mode, so that it is possible to suitably control the driving force of the electric motor in accordance with a plurality of traveling modes that are provided. Thereby, the vehicle 1 of the embodiment can allow the user (the driver) to experience (actually feel) a traveling performance difference between traveling modes and enhance the commercial value.

The embodiment described above can be represented as follows.

A vehicle control device including:

a hardware processor, and a storage device storing a program, wherein the hardware processor reads and executes the program stored in the storage device to:

acquire a state of a first battery and a state of a second battery having lower capacity and higher power than the first battery;

calculate a first upper power limit value of the first battery based on the state of the first battery, calculate a second upper power limit value of the second battery based on the state of the second battery, and calculate a power output ratio that is the ratio between amounts of electric power to be supplied from the first battery and the second battery to a motor that outputs motive power for traveling based on the first upper power limit value and the second upper power limit value that have been calculated;

determine the maximum amount of electric power to be output to the motor based on traveling modes of a vehicle including a first traveling mode in which traveling performance has at least higher priority than that in another traveling mode and a second traveling mode different from the first traveling mode, the maximum driving force in the motor, and the power output ratio; and change the maximum amount of electric power based on whether or not the traveling mode is the first traveling mode.

Although modes for carrying out the present invention have been described using embodiments, the present invention is not limited to the embodiments and various modifications and substitutions can also be made without departing from the scope and spirit of the present invention.

What is claimed is:

1. A vehicle control device comprising a processor configured to execute computer-readable instructions to perform:

acquiring a state of a first battery and a state of a second battery having lower capacity and higher power than the first battery;

calculating a first upper power limit value of the first battery based on the state of the first battery;

calculating a second upper power limit value of the second battery based on the state of the second battery; and calculating a power output ratio that is a ratio between amounts of electric power to be supplied from the first battery and the second battery to a motor that outputs motive power for traveling based on the first upper power limit value and the second upper power limit value that have been calculated; and controlling electric power to be output to the motor based on traveling modes of a vehicle including a first traveling mode in which traveling performance has at least higher priority than that in another traveling mode and a second traveling mode different from the first traveling mode, a maximum driving force in the motor, and the power output ratio, wherein the controlling of the electric power comprises changing a maximum amount of electric power based on whether or not a traveling mode is the first traveling mode, the maximum amount of electric power to be output in the first traveling mode being made larger than the maximum amount of electric power to be output in the another traveling mode, and wherein the processor is further configured to execute the computer-readable instructions to perform:

when the traveling mode is the first traveling mode, calculating a first time period until the electric power to be output in the first traveling mode reaches the maximum amount based on a first target time corresponding to the first traveling mode and the maximum driving force in the motor;

when the traveling mode is the another traveling mode, calculating a second time period until the electric power to be output in the another traveling mode reaches the maximum amount based on a second target time corresponding to the another traveling mode, adjustment to cause the first time period to be shorter than the second time period being performed; and controlling the electric power to be output to the motor based on the first time period and the second time period.

2. The vehicle control device according to claim 1, wherein the processor is configured to execute the computer-readable instructions to perform:

determining the maximum amount of electric power to be output in the first traveling mode based on at least the maximum driving force, and determining the maximum amount of electric power to be output in the another traveling mode based on at least the maximum driving force and the power output ratio.

3. The vehicle control device according to claim 2, wherein the first traveling mode is the traveling mode in which an amount of electric power obtained by adding an amount of electric power from the second battery to an amount of electric power from the first battery is output to the motor, and wherein the another traveling mode is the traveling mode in which at least the amount of electric power from the first battery is output to the motor.

4. The vehicle control device according to claim 3, wherein the another traveling mode includes the second traveling mode in which the amount of electric power from the first battery is output to the motor and a third traveling mode in which an amount of electric power obtained by compensating the amount of electric power from the first battery with the amount of electric power from the second battery is output to the motor.

5. The vehicle control device according to claim 1,
wherein the first traveling mode is the traveling mode in which an amount of electric power obtained by adding an amount of electric power from the second battery to an amount of electric power from the first battery is output to the motor, and
wherein the another traveling mode is the traveling mode in which at least the amount of electric power from the first battery is output to the motor.

6. The vehicle control device according to claim 5, wherein the another traveling mode includes the second traveling mode in which the amount of electric power from the first battery is output to the motor and a third traveling mode in which an amount of electric power obtained by compensating the amount of electric power from the first battery with the amount of electric power from the second battery is output to the motor.

7. A vehicle control method comprising:
acquiring, by a computer, a state of a first battery and a state of a second battery having lower capacity and higher power than the first battery;
calculating, by the computer, a first upper power limit value of the first battery based on the state of the first battery, calculating a second upper power limit value of the second battery based on the state of the second battery, and calculating a power output ratio that is a ratio between amounts of electric power to be supplied from the first battery and the second battery to a motor that outputs motive power for traveling based on the first upper power limit value and the second upper power limit value that have been calculated;
determining, by the computer, a maximum amount of electric power to be output to the motor based on traveling modes of a vehicle including a first traveling mode in which traveling performance has at least higher priority than that in another traveling mode and a second traveling mode different from the first traveling mode, a maximum driving force in the motor, and the power output ratio; and
changing, by the computer, the maximum amount of electric power based on whether or not a traveling mode is the first traveling mode, the maximum amount of electric power to be output in the first traveling mode being made larger than the maximum amount of electric power to be output in the another traveling mode, and
wherein the vehicle control method further comprises:
when the traveling mode is the first traveling mode, calculating a first time period until the electric power to be output in the first traveling mode reaches the maximum amount based on a first target time corresponding to the first traveling mode and the maximum driving force in the motor;

when the traveling mode is the another traveling mode, calculating a second time period until the electric power to be output in the another traveling mode reaches the maximum amount based on a second target time corresponding to the another traveling mode, adjustment to cause the first time period to be shorter than the second time period being performed; and
controlling the electric power to be output to the motor based on the first time period and the second time period.

8. A non-transitory computer-readable storage medium storing a program for causing a computer to:
acquire a state of a first battery and a state of a second battery having lower capacity and higher power than the first battery;
calculate a first upper power limit value of the first battery based on the state of the first battery, calculate a second upper power limit value of the second battery based on the state of the second battery, and calculate a power output ratio that is a ratio between amounts of electric power to be supplied from the first battery and the second battery to a motor that outputs motive power for traveling based on the first upper power limit value and the second upper power limit value that have been calculated;
determine a maximum amount of electric power to be output to the motor based on traveling modes of a vehicle including a first traveling mode in which traveling performance has at least higher priority than that in another traveling mode and a second traveling mode different from the first traveling mode, a maximum driving force in the motor, and the power output ratio; and
change the maximum amount of electric power based on whether or not a traveling mode is the first traveling mode, the maximum amount of electric power to be output in the first traveling mode being made larger than the maximum amount of electric power to be output in the another traveling mode, and
wherein the program further causes the computer to:
when the traveling mode is the first traveling mode, calculate a first time period until the electric power to be output in the first traveling mode reaches the maximum amount based on a first target time corresponding to the first traveling mode and the maximum driving force in the motor;
when the traveling mode is the another traveling mode, calculate a second time period until the electric power to be output in the another traveling mode reaches the maximum amount based on a second target time corresponding to the another traveling mode, adjustment to cause the first time period to be shorter than the second time period being performed; and
control the electric power to be output to the motor based on the first time period and the second time period.

* * * * *